United States Patent
Zhang et al.

(10) Patent No.: US 9,641,037 B2
(45) Date of Patent: May 2, 2017

(54) STATOR SLOT LINERS

(71) Applicant: General Electric Company, Schenectady, NY (US)

(72) Inventors: Wei Zhang, Ballston Lake, NY (US); RiAn Zhao, Niskayuna, NY (US); Xiaomei Fang, Glastonbury, CT (US); Matthew Hal Littlejohn, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 369 days.

(21) Appl. No.: 14/471,488

(22) Filed: Aug. 28, 2014

(65) Prior Publication Data

US 2016/0065025 A1 Mar. 3, 2016

(51) Int. Cl.
| | |
|---|---|
| *H02K 3/34* | (2006.01) |
| *B29C 70/68* | (2006.01) |
| *H02K 3/30* | (2006.01) |
| *H02K 15/04* | (2006.01) |
| *H02K 15/10* | (2006.01) |
| *B29C 70/88* | (2006.01) |
| *B29C 70/02* | (2006.01) |
| *B29L 31/34* | (2006.01) |

(52) U.S. Cl.
CPC ............ *H02K 3/345* (2013.01); *B29C 70/025* (2013.01); *B29C 70/688* (2013.01); *B29C 70/88* (2013.01); *H02K 3/30* (2013.01); *H02K 15/04* (2013.01); *H02K 15/10* (2013.01); *B29L 2031/34* (2013.01)

(58) Field of Classification Search
CPC  C08K 3/38; C08L 33/00; B29C 70/88; B32B 27/18; B32B 5/26; B32B 27/12; B32B 27/34; H02K 3/24; H02K 3/30; H02K 1/12; H02K 15/04

USPC .......................................................... 310/215
See application file for complete search history.

(56) References Cited

U.S. PATENT DOCUMENTS

| | | | |
|---|---|---|---|
| 4,087,712 A | | 5/1978 | Mosimann et al. |
| 4,923,718 A | * | 5/1990 | Iida .......................... C08J 7/047 427/386 |
| 5,319,269 A | | 6/1994 | Bryant |
| 5,710,475 A | | 1/1998 | Irwin et al. |
| 5,982,056 A | | 11/1999 | Koyama et al. |

(Continued)

FOREIGN PATENT DOCUMENTS

| | | |
|---|---|---|
| DE | 102010002721 | 11/2011 |
| JP | 545564 A | 1/1979 |

(Continued)

OTHER PUBLICATIONS

Great Britain Combined Search and Examination Report issued in connection with corresponding GB Application No. 1514876.0 on Feb. 29, 2016.

(Continued)

*Primary Examiner* — Tran Nguyen
(74) *Attorney, Agent, or Firm* — Nitin N. Joshi

(57) ABSTRACT

A slot liner for a stator assembly in one embodiment includes a mesh structural member and a coating. The coating is disposed on at least one side of the mesh structural member, and includes a mixture of a filler and a polyimide resin. The filler is a high thermal conductivity electrical insulating (HTCEI) filler, and includes particles of at least one of boron nitride, aluminum nitride, or a diamond material.

20 Claims, 6 Drawing Sheets

(56) References Cited

U.S. PATENT DOCUMENTS

| | | | |
|---|---|---|---|
| 7,015,396 B2 | 3/2006 | Wada et al. | |
| 7,081,697 B2 * | 7/2006 | Neet | H02K 3/345 310/201 |
| 8,030,818 B2 | 10/2011 | Nelson et al. | |
| 8,664,817 B2 | 3/2014 | Rumbaugh et al. | |
| 2011/0012474 A1 | 1/2011 | Levit et al. | |
| 2012/0108122 A1 | 5/2012 | Elia et al. | |
| 2012/0169172 A1 | 7/2012 | Anderton et al. | |
| 2013/0069478 A1 | 3/2013 | Hamer | |
| 2013/0207395 A1 | 8/2013 | Huang et al. | |

FOREIGN PATENT DOCUMENTS

| | | |
|---|---|---|
| JP | 2009071945 A | 4/2009 |
| WO | 2004008603 | 1/2004 |
| WO | 2008145190 | 12/2008 |
| WO | 2012158236 | 11/2012 |
| WO | 2013167327 A1 | 11/2013 |

OTHER PUBLICATIONS

Fuchs, "Integration of Tough and Homogenous Layers Inproves Breakdown Stremght of Gfrp Laminated Rotor Slot Liners in Large Turbogenerators", Electrical Insulation, IEEE Transactions on (vol. EI-12 , Issue: 2 ), pp. 171-175, Apr. 1977.

Miller et al., "Turbine generator stator slot thermal conductivity", Electrical Insulation Conference and Electrical Manufacturing & Coil Winding Conference, 1999. Proceedings, IEEE, 1999, pp. 65-69, Cincinnati, OH.

* cited by examiner

STATOR SLOT LINERS

BACKGROUND

Electric power systems, such as generators or motors, may be used to provide electrical power from a mechanical input (e.g., rotation of a shaft used to provide electrical power by a generator), or to provide a mechanical output from input electrical power (e.g., use of electrical power to rotate a shaft by a motor). These devices may be used in applications, such as aircraft, where it is desirable to provide a large amount of power while minimizing the amount of space occupied and/or weight of the power system.

Such power systems may route electrical current through windings that pass through slots of stators and/or rotors. To prevent the passage of electrical charge from the windings to the slots, slot liners may be employed. As the electric current passes through the windings, the windings may be heated. However, conventional slot liners provide limited heat transfer ability to remove heat from the windings. Various power systems may be limited in the available power output by the ability to remove heat from the windings as electric current passes through the windings.

For example, for high performance motor or generators (e.g., generator for use in aircraft), power density may be an important consideration or aspect of motor or generator design. Power density is largely related to heat transfer effectiveness. Heat transfer of the stator may be limited by various electrically and thermally insulating materials such as conventional slot liners, which limit the heat transfer from the copper wire (e.g., to a cooling loop located on an outside diameter of the stator), and thereby limit the power density.

BRIEF DESCRIPTION

In one embodiment, a slot liner is provided for a stator assembly of a power system. The slot liner includes a mesh structural member and a coating. The coating is disposed on at least one side of the mesh structural member, and includes a mixture of a filler and a polyimide resin. The filler in various embodiments is a high thermal conductivity electrical insulating (HTCEI) filler, and includes particles of at least one of boron nitride, aluminum nitride, or a diamond material.

In another embodiment, a stator assembly for a power system is provided that includes an annular member, windings, and slot liners. The annular member defines a bore, and slots formed in the annular member have openings extending toward the bore. The windings pass through the slots. The slot liners are disposed in the slots and interposed between the windings and the annular member. Each slot liner includes a mesh structural member and a coating. The coating is disposed on at least one side of the mesh structural member, and includes a mixture of a filler and a polyimide resin. The filler in various embodiments is a high thermal conductivity electrical insulating (HTCEI) filler, and includes particles of at least one of boron nitride, aluminum nitride, or a diamond material.

In another embodiment, a method (e.g., a method for forming a slot liner) is provided. The method includes providing a mesh structural member, a polyimide resin precursor, and a high thermal conductivity electrical insulating (HTCEI) filler. The HTCEI filler includes particles of at least one of boron nitride, aluminum nitride, or a diamond material. The method also includes mixing the polyimide resin precursor and the HTCEI filler to provide a coating, and coating at least one side of the mesh structural member with the coating to provide a liner material. Further, the method includes curing the liner material and forming the liner material into a shape configured to be accepted by a slot of a stator assembly.

DETAILED DESCRIPTION

Figure 1:
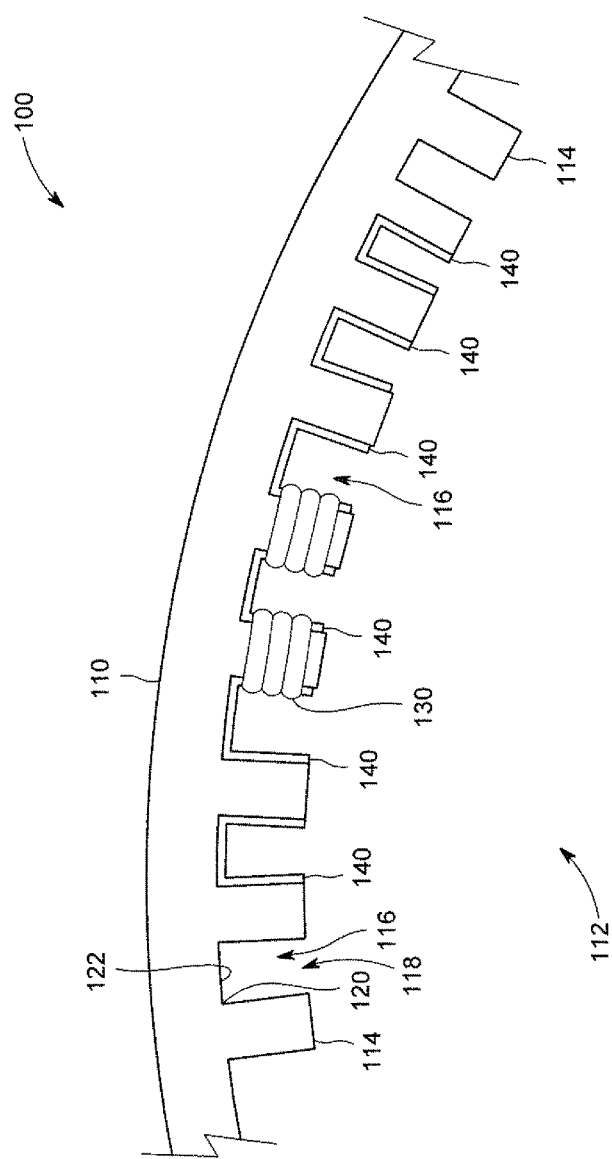
FIG. 1 is an end view of a stator assembly in accordance with various embodiments.

Various embodiments will be better understood when read in conjunction with the appended drawings. To the extent that the figures illustrate diagrams of the functional blocks of various embodiments, the functional blocks are not necessarily indicative of the division between hardware circuitry. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide for improved heat transfer and power density of power systems such as motors and generators, for example by improving heat transfer from windings to a stator via the slot liners. Various embodiments provide slot liner materials for use at high temperatures that provide relatively high thermal conductivity while providing relatively high electrical insulation to provide improved heat transfer and/or improved high temperature capability for high power density electrical machines (e.g., motors or generators).

In certain conventional generators or motors, copper conductors or windings are electrically insulated from a stator core using slot liners made of materials such as NOMEX® paper, KAPTON® film, or the like. Conventional slot liner materials may provide relatively high dielectric strength and relatively good mechanical properties, but lack relatively high heat transfer capabilities. Conventional slot liner materials may have relatively low thermal conductivities, for example on the order of about 0.1 to 0.2 W/(m*K) (where W is watts, m is meters, and K is degrees Kelvin).

Various embodiments disclosed herein provide improved slot liner materials that provide relatively high temperature capability while improving thermal conductivity, for example by about 10 times over the convention slot liners discussed above. In various embodiments, a slot liner material is utilized that includes a polyether ether ketone (PEEK) mesh with reinforcement and coated with high temperature polyimide resin and boron nitride additives. Further, mechanical properties of the slot liner of various embodiments may be readily tuned or adjusted for different applications using different mesh constructions or configurations (e.g., mesh material, mesh opening, or yarn size). For example, a mesh in some embodiments may be formed using a yarn made of NOMEX®. By way of example, the yarn in various embodiments may have different levels of yarn twist and mesh cell openings ranging from 50 microns up to 1 millimeter to suit particular applications. Various embodiments provide stator assemblies utilizing slot liners disclosed herein, allowing heat generated by copper wires or windings of a stator in a motor or generator to be more readily transferred out of the copper wires or windings, thereby lowering the operating temperature of the machine. Further, if lower operating temperature is not desired or required, by using high thermally conductive slot liners, additional power output may be provided for a similar temperature rise compared to conventional slot liners.

At least one technical effect of various embodiments includes improved heat transfer of heat away from windings of a stator. At least one technical effect of various embodiments includes improved power density of motors and/or generators. At least one technical effect of various embodiments is the provision of a slot liner material having about 10 times higher thermal conductivity than conventional slot liner materials. At least one technical effect of various embodiments is providing a slot liner material having a combination of relatively high thermal conductivity, relatively high electrical insulation, and good mechanical properties for use with a stator, while providing for high temperature use.

FIG. 1 is an end view of a stator assembly 100 formed in accordance with various embodiments. The depicted stator assembly 100 includes an annular member 110, windings 130, and slot liners 140. For clarity and ease of illustration, only a portion of the annular member 110 is shown in FIG. 1, and the stator assembly 100 is shown in a partially assembled condition (e.g., as seen in FIG. 1, not all slots have slot liners, and not all windings have been added). Generally, the windings 130 (e.g., copper conductors such as wires) are wound about portions of the annular member 110 and used to conduct electric current to provide for relative movement of a rotor with respect to the stator assembly 100 when used with a motor, or to provide for the transmission of current generated when a rotor is rotated relative to the stator assembly 100 when used with a generator. The slot liners 140 are interposed between the windings 130 and the annular member 110 of the stator assembly 100, and electrically insulate the annular member 110 from the windings 130. In the illustrated embodiment, as discussed herein, the slot liners 140 are configured to provide for a relatively high thermal conductivity to provide for improved heat transfer of heat away from the windings 130 to the annular member 110 of the stator assembly 100. Heat may be transferred out of the annular member 110, for example by using a heat sink and/or cooling system operatively coupled to the annular member 110. The general relationship between the stator assembly 100 and other components or aspects of a power system (e.g., motor or generator) is depicted in FIG. 2.

Figure 2:
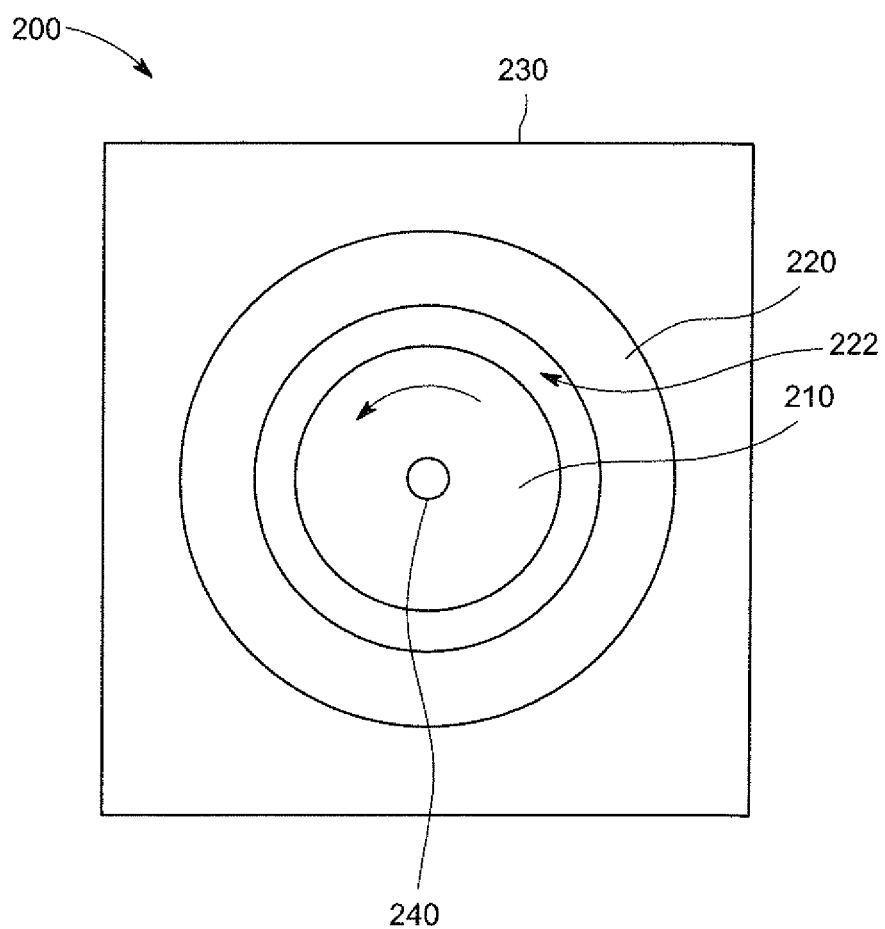
FIG. 2 is a schematic diagram of a power system in accordance with various embodiments.

FIG. 2 provides a schematic diagram of a power system 200 in accordance with various embodiments. The power system 200 includes a rotor assembly 210, a stator assembly 220 (which may be generally similar in various respects to the stator assembly 100 discussed herein), a housing 230, and a shaft 240. The power system 200 may be configured as a generator or as a motor. In various embodiments, the power system 200 may be configured for alternating current (AC) operation. Further, the power system 200 may be configured for direct current (DC) operation in various embodiments.

Generally, the rotor assembly 210 is configured to be disposed within a bore 222 or central opening of the stator assembly 220, and to rotate with respect to the stator assembly 220. When the power system 200 is operated as a motor, electric current passing through windings of the rotor assembly 210 and/or windings of the stator assembly 220 cause a rotation of the rotor assembly 210 relative to the stator assembly 220. When the power system 200 is operated as a generator, a rotation of the rotor assembly 210 with respect to the stator assembly 220 causes the generation of an electric current within the windings of the rotor assembly 210 and/or the stator assembly that may be output. The electric current may be output by the generator for use by one or more external (e.g., external to the power system 200) devices and/or systems.

The housing 230 in the illustrated embodiment provides support and mounting for the stator assembly 220, helping maintain the stator assembly 220 in a stationary position while the rotor assembly 210 rotates. The housing 230 may also provide mounting features, for example, one or more bearings, for mounting the rotor assembly 210. Further, the depicted housing 230 is configured to act as a heat sink or to otherwise provide heat transfer from the stator assembly 220. For example, the housing 230 may be thermally coupled to the stator assembly 220, and include fins and/or a fluid cooling system to dissipate heat provided by the stator assembly 220 to the housing 230. Heat generated in the windings of the stator assembly 220 may thus be transferred from the windings to a stator (e.g., annular member 110) via slot liners (e.g., slot liners 140), then from the stator to the housing 230, and from the housing 230 to an external source or environment (e.g., via fins and/or a cooling fluid). Improving heat transfer (e.g., by improving thermal conductivity of the slot liners 140) in various embodiments allows for improved power density, for example.

The shaft 240 is operably coupled to the rotor assembly 210 and is configured to rotate with the rotor assembly 210. The shaft 240 is configured to facilitate the conversion of mechanical power (e.g., rotation) to electrical power (e.g., current) or vice versa. When the power system 200 is operated as a generator, the shaft 240 is used to provide a rotational input to the power system 200 that is used to generate an electric current. When the power system 200 is operated as a motor, the shaft 240 is used to output a rotation for use by a system coupled to the power system 200.

Returning to FIG. 1, the annular member 110 defines a bore 112 disposed in a central or interior portion of the annular member 110. The bore 112 is sized and configured to accept a rotor assembly (not shown in FIG. 1; see FIG. 2). The annular member 110 as shown in FIG. 1 includes arms 114 extending from a surface 122 of the annular member 110 toward the bore 112 or interior of the annular member 110. The arms 114 are configured to provide structures around which the windings 130 may be wrapped or otherwise mounted. Slots 116 are defined between the arms 114. The slots 116 are configured to accept the slot liners 140, and to provide space to be occupied by the windings 130 when the windings 130 are wrapped about the arms 114. The windings 130 wrapped about a given arm 114 pass through the slots 116 on either side of the particular arm 114. As seen in FIG.

1, the slots 116 have slot openings 118 that extend toward the bore 112. Put another way, the slots 116 open toward an interior of the annular member 110. Further, the slots 116 include at least one bend 120 where the arms 114 extend away from an interior surface 122 of the annular member 110. In the illustrated embodiment, the bend 120 is about 90 degrees. (As used herein, an angle of about 90 degrees may be understood as including angles within 5% of 90 degrees). The arrangement of the various aspects of the stator assembly (e.g., annular ring, arms, slots) is provided by way of example for illustrative purposes in FIG. 1. It should be noted that the particular geometry or configuration (e.g., size, shape, orientation, number of a given component or aspect, among others) employed may vary in different embodiments.

The slot liners 140 are disposed in the slots 116, and are interposed between the windings 130 and the annular member 110 (e.g., interposed between the windings 130 and the arms 114 of the annular member 110). The slot liners 140 are configured to electrically insulate the annular member 110 from the windings 130. In the illustrated embodiments, the slot liners 140 are also configured to provide improved heat transfer from the windings 130 to the annular member 110 relative to conventional slot liners. The depicted slot liners 140 are configured to have a relatively high thermal conductivity. For example, the slot liners 140 may have a thermal conductivity of 1.5 W/(m*K) or higher in various embodiments. The slot liners 140 are shown as being generally flush with the ends of the arms 114 or slots 116, but may extend beyond the ends of the arms 114 or slots 116 in various embodiments in one or more directions.

Figure 3:
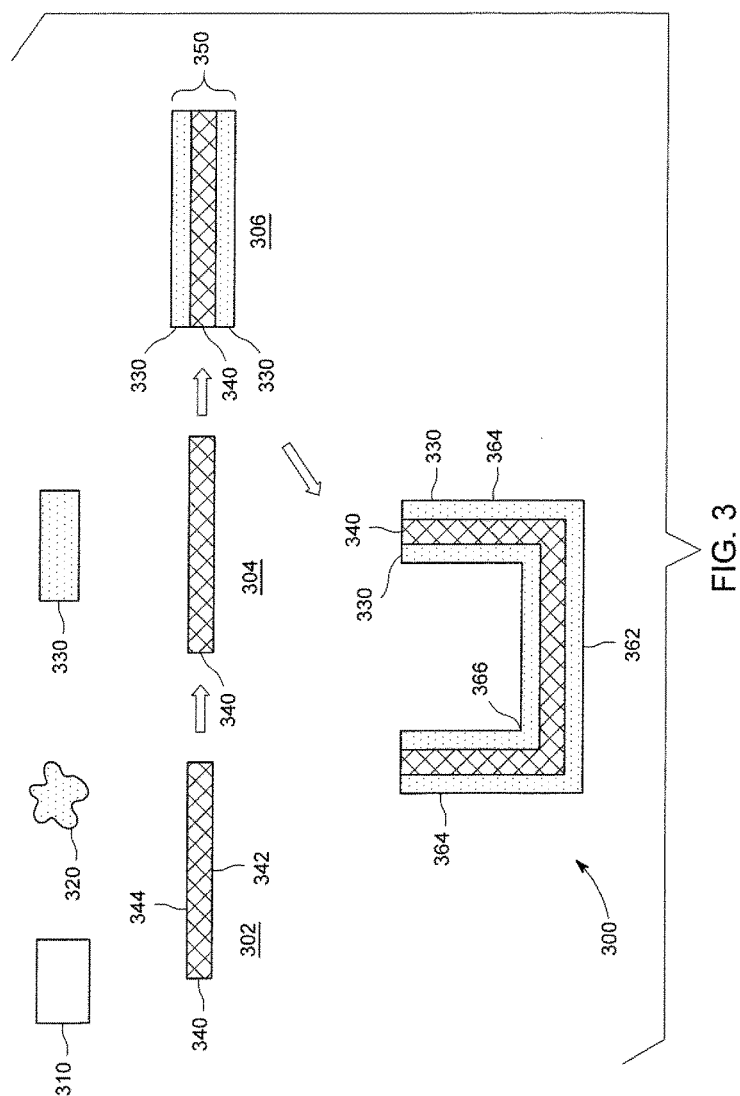
FIG. 3 illustrates a slot liner and formation thereof in accordance with various embodiments.

FIG. 3 illustrates various aspects of a slot liner 300 as well as various stages in the production and/or formation of the slot liner 300. The slot liner 300 may be substantially similar to the slot liner 140 discussed in connection with FIG. 1. The depicted slot liner 300 includes a mesh structural member 340, and a coating 330. The coating 330 is disposed on at least one side of the mesh structural member 340. It may be noted that, as used herein, a coating disposed on at least one side of the mesh structural member 340 may also be understood as permeating or occupying spaces within the mesh structural member 340, for example due to an introduction on at least one side of the mesh structural member. In the illustrated embodiment, the coating 330 is disposed on two (e.g., opposite) sides of the mesh structural member 340.

The mesh structural member 340 is configured to provide support and mechanical reliability for the slot liner 300. The particular materials used for the mesh structural member 340, as well as the arrangement (e.g., yarn size used to weave the mesh, size of openings in mesh or distance between yarn, or the like) may be configured for compatibility with a particular filler or filler size, or for a particular application (e.g., size of slot, geometry of slot, demands of particular generator or motor, or the like). The material used for the mesh structural member 340 may be selected to provide a desired ability to maintain the coating in position on the mesh and a desired mechanical strength and/or durability or reliability. For example, in some embodiments, the mesh structural member may be formed from materials such as fiberglass or KEVLAR®. However, meshes made with such materials as fiberglass or KEVLAR® may experience an undesirable amount of cracking if bent at about 90 degrees to match a perpendicular or near perpendicular bend in a slot. In various embodiments, the mesh structural member 340 may be made from PEEK, or, as another example, the mesh structural member 340 may be made from a yarn made of NOMEX®, to provide improved performance (reduced cracking) for applications having bends of about 90 degrees (or more) in the slot liner 300. As seen in FIG. 3, the mesh structural member 340 has a first side 342 and second side 344 disposed opposite each other. The coating 330 may be applied to one or both of the first side 342 and second side 344 in various embodiments, and may penetrate into the mesh after application.

The coating 330 includes a resin 310 and filler 320. The resin 310 and the filler 320 may be selected for compatibility with each other as well as to provide desired electrical, thermal, and/or mechanical properties, as well as compatibility or adhesion to the mesh structural member 340. In various embodiments, the coating 330 may be comprised of between 50 and 65 percent resin 310 by weight, or be comprised of between 35 and 50 percent of filler 320 by weight.

The resin 310 (or varnish) is configured to provide a coatable substance into which the filler 310 may be mixed for subsequent application to one or more sides of the mesh structural member 340. It may be noted that, in various embodiments, the resin 310 may undergo a transformation or change during the formation of the slot liner. For example, the resin 310 may be provided in an initial form and mixed, in the initial form, with the filler 320 to provide the coating 330. The coating 330 may then be applied to the mesh structural member 340. After the coating 330 is applied to the mesh structural member 340, the coated mesh may be cured, for example in a vacuum oven. During the curing process, the resin 310 may cure or transform to a different form or substance. For example, the resin 310 may transform from a precursor to a final form. In some embodiments, the resin 310 may be provided in an initial form of or including a polyimide precursor (e.g., polyamic acid), and, after curing, be in a final form of or including a polyimide resin. (As used herein, a polyimide may be understood as a polymer of imide monomers.) The particular resin selected may be configured or selected, for example, at least in part based on ability to bond with the filler 320 and compatibility with the filler 320.

Generally, the filler 320 may be selected to provide the slot liner 300 with a relatively high thermal conductivity (e.g., 1.5 W/(m*K) or more, or 10 times the thermal conductivity of conventional slot liners), while still providing a desired amount of electrical insulation and/or dielectric strength. In some embodiments, the filler 320 may thus be understood as a high thermal conductivity electrical insulating (HTCEI) filler. The filler 320, for example, may comprise particles of one or more of boron nitride, aluminum nitride, or a diamond material (e.g., diamond powder). In theory a substance such as aluminum oxide may be employed; however, to provide a sufficiently high thermal conductivity, a relatively large amount of aluminum oxide may be required, which may result in degraded mechanical properties and/or cracking during forming or positioning (e.g., when forming a bend of about 90 degrees or more). In some embodiments, the filler 320 may include boron nitride particles sized between 10 nanometers and 100 microns. For example, in some embodiments, the filler 320 may include boron nitride particles sized between about 10 nanometers and 300 nanometers. The particular sizes used may be selected, for example, to provide a balance or trade-off between desired mechanical and thermal properties. For example, for a given application, a larger particle size may provide improved thermal conductivity, but may provide reduced mechanical capability, while a smaller particle size may provide improved mechanical capability while still providing sufficient (albeit lower) thermal conductivity than the larger particle size.

As shown in FIG. 3, the resin 310, filler 320, and mesh structural member 340 may be utilized to produce the slot liner 300. In the depicted embodiment, at 302, the mesh structural member 340 is provided along with the resin 310 and filler 320. The resin 310 may be in a precursor stage at 302. At 304, the resin 310 (e.g., still in the precursor stage) may be mixed with the filler 320 to provide the coating 330. At 306, the coating 330 is applied to at least one side of the mesh structural member 340 to provide slot liner material 350. It may be noted that the coating 330 may not necessarily be limited to an exterior of the mesh structural member 340, but may penetrate into the mesh structural member for improved or more uniform distribution of the particles of the filler 320. For example, the openings in the mesh may be configured to accept the size of particles in the filler 320. In the illustrated embodiment, the coating 330 is applied to the first side 342 and the second side 344 of the mesh structural member 340, and thus is disposed on both sides and/or penetrates the mesh from both sides.

The slot liner material 350 may be provided for example, in the form of a sheet. The slot liner material 350 may next be cured. During the curing, a material of the resin 310 may change form or stage. For example, the resin 310 may be comprised of a polyamic acid before curing, and a polyimide after curing. In various embodiments, the resin 310 is configured to provide for mixing and coating in the precursor stage, while providing desired mechanical and/or other properties in the post-curing stage. After curing, the slot liner material 350 may be formed into the slot liner 300 (or a plurality of slot liners 300). For example, the slot liner material 350 may be formed as a sheet, cured, and cut into strips that are formed (e.g., in a press using pressure, or pressure along with heat) into a desired shape.

In FIG. 3, a generally U-shaped slot liner 300 is depicted. As used herein, a generally U-shaped slot liner may be understood as having a base from which legs extend in a common direction from either side of the base, as seen in FIG. 3. In some embodiments, the legs may extend from the base substantially perpendicularly, or at about 90 degrees. In FIG. 3, the slot liner 300 includes a base 362 from which legs 364 extend. The slot liner 300, for example, may be sized and configured to be accepted by a slot 116 of the annular member 110 of the stator assembly 100. As seen in FIG. 3, the legs 364 extend from the base 362 at an angle 366. The angle 366 may be about 90 degrees when the slot liner 300 is placed in a stator. It may be noted that the slot liner 300 need not be rigid, and may be pliable or flexible when outside of the slot. The particular bends in the slot liner 300 (e.g., angle 366) generally correspond to bends or angles in the slot for convenient and accurate placement and positioning of the slot liner 300 in the slot. The slot liner material 350 and resulting slot liner 300 may have a thickness of about 5 mil (0.005 inches) in various embodiments. It may be noted that the particular geometry (e.g., size, shape) of the slot liner 300 depicted in FIG. 3 is provided by way of example for illustrative purposes, and that other sizes, shapes, or arrangements of slot liners may be employed in alternate embodiments, for example to correspond to different shapes and sizes of slots. By way of example, slot liners may be "V" or "L" shaped, have multiple or compound bends, and/or have rounded features or bends in various embodiments.

Various embodiments thus provide slot liners having desirable mechanical qualities (reliability, strength, capable of being bent 90 degrees (or more, such as 180 degrees) without cracking or with negligible, minimized, or reduced cracking), beneficial electrical qualities (providing sufficient electrical insulation between stator and windings, relatively high dielectric strength, or the like), and relatively high thermal conductivity (e.g., 1.5 W/(m*K) or higher). Generally, in various embodiments, the filler (e.g., boron nitride) may help provide desired thermal conductivity and electrical properties, while the mesh may help provide mechanical stability and facilitate convenient forming to a desired size and/or shape.

Figure 4:
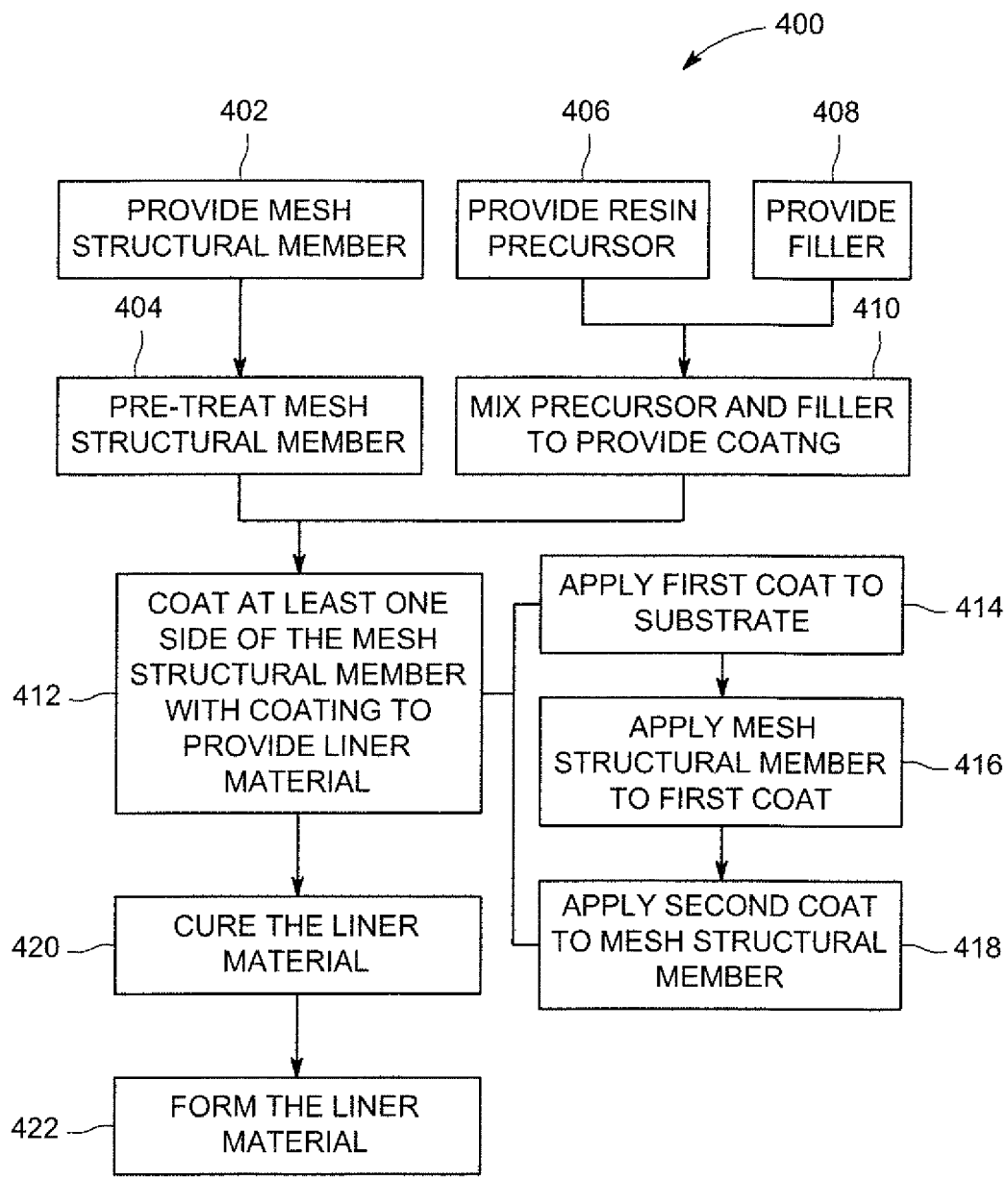
FIG. 4 is a flowchart of a method for providing a slot liner in accordance with various embodiments.

FIG. 4 provides a flowchart of a method 400 for providing a slot liner (e.g., a slot liner for a stator). In various embodiments, the method 400, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. It may be noted that the method 400 and flowchart provided in FIG. 4 are provided by way of example for illustrative purposes.

In the illustrative and non-limiting illustrated embodiment, at 402, a mesh structural member is provided. For example, the mesh structural member (e.g., mesh structural member 340), may be formed using PEEK. As another example, a yarn made of NOMEX® may be utilized. The particular configuration of the mesh (e.g., yarn size or thickness, size or number of openings in weave, or the like) may be tailored for a particular application (e.g., particle size, required mechanical strength or rigidity, or the like).

At 404, the mesh structural member is pre-treated. The pre-treatment is performed in various embodiments to clean the mesh and/or to provide improved bonding and reliability. For example, for PEEK meshes, the mesh may be pre-treated with a hexane rinse and a plasma treatment. As another example, in some embodiments, NOMEX® may provide sufficient bonding without a plasma treatment, and a NOMEX® mesh may be pre-treated with a hexane rinse but without a plasma treatment.

At 406, a resin precursor is provided. The resin precursor is configured for ready and convenient mixing with a filler and subsequent coating onto the mesh structural member (e.g., after the mesh structural member is pre-treated). The resin precursor in various embodiments may be a polyimide resin precursor, such as polyamic acid, that becomes the polyimide after curing.

At 408, a filler is provided. For example, the filler may be a HTCEI filler as discussed herein. In various embodiments, the filler may include particles of at least one of boron nitride, aluminum nitride, or a diamond material. For example, in some embodiments, the filler may include particles of boron nitride sized within a range of between 10 nanometers and 100 microns. As another example, the filler may include particles of boron nitride sized within a range of between 100 nanometers and 300 nanometers.

At 410, the precursor and filler are mixed to provide a coating. In some embodiments, the precursor may comprise between 50 and 65 percent of the mixture by weight. The filler may comprise between 35 and 50 percent of the mixture by weight in various embodiments.

At 412, the coating is applied to at least one side of the mesh structural member to provide liner material (e.g., slot liner material 350). In various embodiments, the coating may be applied to both sides of a mesh sheet, for example.

The coating may be applied in some embodiments in a series of substeps, for example substeps 414, 416, and 418 as shown in FIG. 4.

At 414, a first coat of the coating is applied to a substrate. The substrate, for example, may be a generally flat surface made of a material such as glass. The substrate may generally be configured in various embodiments so that the coating will not adhere or substantially adhere to the substrate, so that the slot liner material including the coating may be readily removed from the substrate. The application of a first coat 520 to a substrate 510 is schematically depicted at 502 of FIG. 5.

Figure 5:
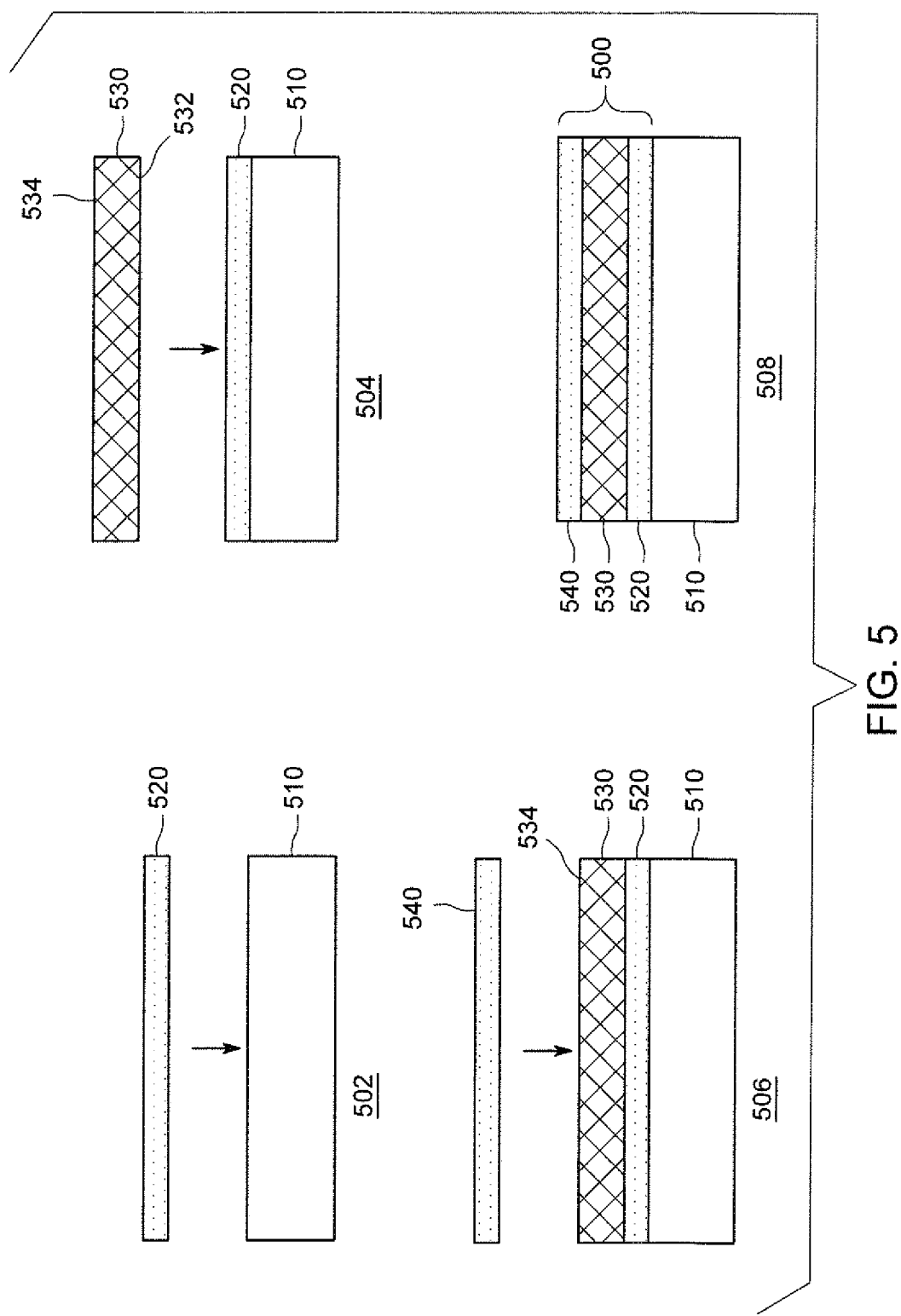
FIG. 5 illustrates a coating process in accordance with various embodiments.

Returning to FIG. 4, at 416, the mesh structural member is applied to the first coat (e.g., on top of the first coat as seen in FIG. 5). The first coat may adhere to a surface and/or penetrate into a side of the mesh structural member oriented toward the first coat. A pressure or force may be applied against the mesh structural member to urge the mesh structural member against the first coat. The application of a mesh structural member 530 to the first coat 520 is schematically depicted at 504 of FIG. 5. In FIG. 5, a first surface 532 of the mesh structural member 530 is oriented toward the first coat 520, and a second surface 534 of the mesh structural member is disposed opposite the first surface 532. As seen in FIG. 5, the first coat 520 is interposed between the mesh structural member 530 and the substrate 510.

Returning to FIG. 4, at 418, a second coat of the coating is applied to the mesh structural member. In the depicted embodiment, the second coat is applied to a side of the mesh structural member opposite to the side oriented toward the first coat. The application of a second coat 540 to the second surface 534 of the mesh structural member 530 is depicted schematically at 506 of FIG. 5. As seen in FIG. 5, the mesh structural member 530 is thus coated with the coating on two sides. At 508, after the second coat has been applied, slot liner material 500 (including the mesh structural member 530 coated with the first coat 520 and the second coat 530 of the coating) is shown on the substrate 510. After the slot liner material 500 is formed, the slot liner material may be removed from the substrate 510 and use to provide one or more slot liners.

Returning again to FIG. 4, at 420, the liner material (e.g., liner material 350, liner material 500) is cured. For example, the slot liner material may be in the form of a sheet (e.g., a sheet of mesh sandwiched between coats of a coating applied to opposite sides of the mesh as discussed herein), and the sheet may be placed in a vacuum oven for curing. In some embodiments, the liner material may be imidized, or polyimide precursor may be cured into polyimide. The liner material may be cured, for example, at about 300 degrees Celsius. During curing or imidization, water vapor may be released. The curing may be performed under the influence of a vacuum (e.g., in a vacuum oven) to help reduce or avoid the formation of microvoid formations in the liner material that may be caused by water vapor release. Additionally or alternatively, the vacuum oven may be purged during the curing with nitrogen gas, for example, to prevent or reduce oxidization at relatively high temperatures (e.g., 300 degrees Celsius).

At 422, the liner material is formed into one or more liner slots. For example, the liner material (or a portion thereof) may be formed into a shape configured to be accepted by a slot of a stator. The slot liner, for example, may have a shape similar to or complimentary the shape of the slot, but may, for example, be differently sized. For example, a U-shaped slot liner may be placed in a U-shaped slot, but the legs of the slot liner may be longer than the legs of the slot, such that the legs of the slot liner extend beyond the edge of the slot (e.g., toward an interior or bore of a stator). As another example, the liner may extend longer in an axial direction than the slot. The liner material, for example, may be bent to a desired shape via the application of heat and pressure to the liner material (e.g., in a heated press). For example, the liner material may be formed using a pressure on the order of a few hundred pounds per square inch (psi), and/or at a temperature of about 200 degrees Celsius. The particular values of the parameters used in forming (e.g., amount of pressure) may be varied, for example, based on thickness of the slot liner. In some embodiments, a cured sheet of liner material may be cut into strips or other portions, with the strips or other portions subsequently bent or otherwise formed into slot liners. For applications utilizing bends of 90 degrees or more, the mesh structural member may be formed using PEEK or NOMEX®, for example, to help eliminate, minimize, or reduce cracking during bending of the liner material.

Figure 6:
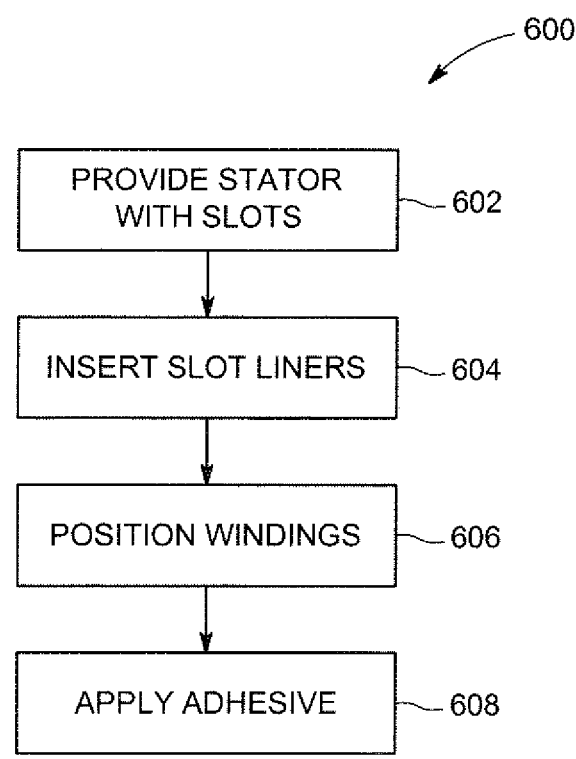
FIG. 6 is a flowchart of a method for providing a stator assembly for a power system in accordance with various embodiments.

FIG. 6 provides a flowchart of a method 600 for providing a stator assembly. In various embodiments, the method 600, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. It may be noted that the method 600 and flowchart provided in FIG. 6 are provided by way of example for illustrative purposes.

In the illustrative and non-limiting illustrated embodiment, at 602, a stator having slots is provided. The stator, for example, may have an annular member (e.g., annular member 110) having arms and slots extending toward an interior of the stator (e.g., toward a bore configured to accept a rotor). The slots may be configured for the placement or positioning of conductors (e.g., copper windings) that surround the arms.

At 604, slot liners (e.g., slot liners 140, slot liners 300) are inserted into the slots. The slot liners may be pre-formed to have a shape corresponding to the shape of the slots into which the slot liners are to be inserted. The slot liners are configured to be interposed between the windings and the stator (e.g., an annular member or body of the stator) and to provide electrical insulation between the stator and the windings. Further, in various embodiments as disclosed herein, the slot liners also provide for relatively high thermal conductivity between the windings and the stator body, thereby allowing for improved removal of heat from the windings and improved power density.

At 606, windings are positioned. The windings are configured for the passage of electric current therethrough. The windings, for example, may be made of copper. The windings may be wound about the arms of the stator and through the slots, with the slot liners interposed between the windings and the stator arms.

At 608, an adhesive is applied. For example, the stator assembly, with the slot liners and windings in place, may be dipped or soaked in a varnish or other adhesive, in order to help secure and maintain the various components of the stator assembly together. The stator assembly may then be used in assembling a power system such as a motor or generator (e.g., a rotor may be disposed within the bore of the stator assembly; the stator assembly may be mounted to a housing and/or other heat sink or heat removal device or system; electrical connections may be made between the windings and power sources, control systems, or the like).

Thus, various embodiments provide for improved power density, for example by allowing higher current through windings and/or more effectively removing heat from the windings. As discussed herein, various embodiments provide for improved slot liners having increased thermal conductivity for improved heat transfer from stator windings, while still providing desirable mechanical and electrical characteristics. For example, slot liners utilizing boron nitride particles, polyimide resin, and PEEK meshes were tested and found to provide numerous beneficial characteristics. For example, example slot liners were tested and found to have properties as outlined in the table below.

| Property | Performance |
|---|---|
| Thermal Conductivity | 1.5 W/(m * K) or greater |
| AC Breakdown | 1500 Volts/mil or greater |
| Tensile Strength | Comparable to conventional slot liners (e.g., KAPTON ®) |
| Oil Compatibility | Compatible |
| Thermal stability at 280 degrees Celsius | Stable |
| Thickness control | +/−0.5 mil |
| Flexibility/toughness | No cracking (or insignificant cracking) for bending at 180 degrees. |
| Varnish compatibility | Compatible |

Additionally, slot liner material having differently sized particles of boron nitride was tested. For example, a slot liner material including boron nitride particles of about 100 nanometers in size was found to have a thermal conductivity of about 1.5 W/(m*K). As another example, a slot liner material including boron nitride particles of about 50 microns in size was found to have a thermal conductivity of about 2.1 W/(m*K).

It should be noted that the particular arrangement of components (e.g., the number, types, placement, or the like) of the illustrated embodiments may be modified in various alternate embodiments. For example, in various embodiments, different numbers, sizes, or shapes of a given component or aspect may be employed.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A slot liner for a stator assembly of a power system, the slot liner comprising:
    a mesh structural member; and
    a coating disposed on at least one side of the mesh structural member, the coating comprising a mixture of
        a high thermal conductivity electrical insulating (HTCEI) filler, the HTCEI filler comprising particles of at least one of boron nitride, aluminum nitride, or a diamond material; and
        a polyimide resin.

2. The slot liner of claim 1, wherein the particles of the filler comprise boron nitride particles having a size between 100 nanometers and 300 nanometers, and the mesh structural member is configured to accept the size of the particles.

3. The slot liner of claim 1, wherein the particles of the filler comprise boron nitride particles having a size between 10 nanometers and 100 microns, and the mesh structural member is configured to accept the size of the particles.

4. The slot liner of claim 1, wherein the mesh structural member comprises a mesh formed with a polyether ether ketone (PEEK) material.

5. The slot liner of claim 1, wherein the mesh structural member comprises a mesh formed with a yarn made of a NOMEX® material.

6. The slot liner of claim 1, wherein the liner is generally U-shaped and includes at least one bend of about 90 degrees when positioned in the stator.

7. The slot liner of claim 1, wherein the polyimide resin comprises between 50 and 65 percent of the coating by weight.

8. The slot liner of claim 1, wherein the coating is disposed on two opposite sides of the mesh structural member.

9. A stator assembly for a power system, the stator assembly comprising:
    an annular member defining a bore;
    slots formed in the annular member having openings extending toward the bore;
    windings passing through the slots; and slot liners disposed in the slots and interposed between the windings and the annular member, wherein the slot liners comprise:
a mesh structural member; and
a coating disposed on at least one side of the mesh structural member, the coating comprising a mixture of
a high thermal conductivity electrical insulating (HTCEI) filler, the HTCEI filler comprising particles of at least one of boron nitride, aluminum nitride, or a diamond material; and
a polyimide resin.

10. The stator assembly of claim 9, wherein the particles of the filler comprise boron nitride particles having a size between 10 nanometers and 100 microns and the mesh structural member is configured to accept the size of the particles.

11. The stator assembly of claim 9, wherein the mesh structural member comprises a mesh formed with at least one of a polyether ether ketone (PEEK) material or a NOMEX® material, and wherein the liner is generally U-shaped and includes at least one bend of about 90 degrees when positioned in one of the slots of the stator.

12. The stator assembly of claim 9, wherein the polyimide resin comprises between 50 and 65 percent of the coating by weight.

13. A method comprising:
providing a mesh structural member, a polyimide resin precursor, and a high thermal conductivity electrical insulating (HTCEI) filler, the HTCEI filler comprising particles of at least one of boron nitride, aluminum nitride, or a diamond material;
mixing the polyimide resin precursor and the HTCEI filler to provide a coating;
coating at least one side of the mesh structural member with the coating to provide a liner material;
curing the liner material; and
forming the liner material into a shape configured to be accepted by a slot of a stator assembly.

14. The method of claim 13, wherein mixing the polyimide resin precursor and the HTCEI filler comprises using an amount of the polyimide resin precursor to provide a coating in which a polyimide resin comprises between 50 and 65 percent of the coating by weight.

15. The method of claim 13, wherein the particles of the filler comprise boron nitride particles having a size between 10 nanometers and 100 microns, and the mesh structural member is configured to accept the size of the particles.

16. The method of claim 13, wherein the particles of the filler comprise boron nitride particles having a size between 100 nanometers and 300 nanometers, and the mesh structural member is configured to accept the size of the particles.

17. The method of claim 13, wherein forming the liner material comprises applying heat and pressure to the liner material.

18. The method of claim 17, wherein the mesh structural member comprises a mesh formed with at least one of a polyether ether ketone (PEEK) material or a NOMEX®material, and wherein forming the liner material comprises forming the liner material into a generally U-shaped structure having at least one bend of about 90 degrees.

19. The method of claim 13, further comprising pre-treating the mesh structural member before coating at least one side of the mesh structural member, wherein pre-treating comprises applying a hexane rinse and plasma treatment.

20. The method of claim 13, wherein the coating at least one side of the mesh structural member comprises:
applying a first coat of the coating to a substrate;
applying the mesh structural member with a first surface oriented toward the first coat of the coating and a second surface opposite the first surface; and
applying a second coat of the coating to the second surface of the mesh structural member.

* * * * *